United States Patent [19]
Englert

[11] Patent Number: 5,817,262
[45] Date of Patent: Oct. 6, 1998

[54] PROCESS OF PRODUCING GYPSUM WOOD FIBER PRODUCT HAVING IMPROVED WATER RESISTANCE

[75] Inventor: Mark H. Englert, Libertyville, Ill.

[73] Assignee: United States Gypsum Company, Chicago, Ill.

[21] Appl. No.: 771,741

[22] Filed: Dec. 20, 1996

[51] Int. Cl.⁶ ........................................ B28B 1/26
[52] U.S. Cl. ................ 264/86; 264/87; 264/236; 264/347; 162/164.4; 162/187
[58] Field of Search ................ 264/86, 236, 347, 264/87; 162/164.4, 187

[56] References Cited

U.S. PATENT DOCUMENTS

| | | |
|---|---|---|
| 2,198,776 | 4/1940 | King et al. . |
| 2,526,537 | 10/1950 | Camp . |
| 3,389,206 | 6/1968 | Jamison . |
| 3,772,065 | 11/1973 | Seiler . |
| 3,822,340 | 7/1974 | Eberl et al. . |
| 3,849,357 | 11/1974 | Wolf . |
| 3,879,206 | 4/1975 | Nestler et al. . |
| 3,914,476 | 10/1975 | Nitzsche et al. . |
| 3,955,895 | 5/1976 | Bosch et al. . |
| 3,956,570 | 5/1976 | Bosch et al. . |
| 4,002,800 | 1/1977 | Nestler et al. . |
| 4,073,972 | 2/1978 | Nestler et al. . |
| 4,076,868 | 2/1978 | Roth et al. . |
| 4,102,703 | 7/1978 | Tully . |
| 4,209,432 | 6/1980 | Roth . |
| 4,239,716 | 12/1980 | Ishida et al. . |
| 4,273,813 | 6/1981 | Meddaugh . |
| 4,328,178 | 5/1982 | Kossatz ................................ 264/69 |
| 4,342,796 | 8/1982 | Brown et al. . |
| 4,352,894 | 10/1982 | Schmidt . |
| 4,392,896 | 7/1983 | Sakakibara ............................ 156/39 |
| 4,413,102 | 11/1983 | Tanaka et al. . |
| 4,433,013 | 2/1984 | Puhringer . |
| 4,478,911 | 10/1984 | Price . |
| 4,486,476 | 12/1984 | Fritsch et al. . |
| 4,631,207 | 12/1986 | Price . |
| 4,643,771 | 2/1987 | Steinbach et al. . |
| 4,645,548 | 2/1987 | Take et al. ............................ 156/39 |
| 4,648,904 | 3/1987 | DePasquale et al. . |
| 4,717,599 | 1/1988 | Merrill . |
| 4,734,163 | 3/1988 | Eberhardt ........................... 162/181.3 |
| 4,741,773 | 5/1988 | Kuroda et al. . |
| 4,753,977 | 6/1988 | Merrill . |
| 4,786,531 | 11/1988 | Hodson . |
| 4,835,014 | 5/1989 | Roth et al. . |
| 4,846,886 | 7/1989 | Fey et al. . |
| 4,874,431 | 10/1989 | Fey et al. . |
| 4,889,747 | 12/1989 | Wilson . |
| 4,895,964 | 1/1990 | Margida . |
| 5,110,684 | 5/1992 | Cooper . |
| 5,120,355 | 6/1992 | Imai . |
| 5,135,805 | 8/1992 | Sellers et al. . |
| 5,314,533 | 5/1994 | Goebel et al. . |
| 5,320,677 | 6/1994 | Baig . |
| 5,366,810 | 11/1994 | Merrifield et al. . |
| 5,371,162 | 12/1994 | Konings et al. . |
| 5,437,722 | 8/1995 | Borenstein . |
| 5,531,812 | 7/1996 | De Montigny . |

FOREIGN PATENT DOCUMENTS

| | | |
|---|---|---|
| 2081242 | 8/1980 | United Kingdom . |
| WO 93/04007 | 3/1993 | WIPO . |

OTHER PUBLICATIONS

The Condensed Chemical Dictionary, 1961, Reinhod Pub. Corp., New York, 6th Edition, pp. 1019 & 1021.

The Condensed Chemical Dictionary, 1961, Reinhodd Pub. Corp., New York, 6th Edition, pp. 1019 & 1021.

*Primary Examiner*—James Derrington
*Attorney, Agent, or Firm*—Donald E. Egan; David F. Janci; John M. Lorenzen

[57] ABSTRACT

A process is described for making a gypsum board having improved water resistance. The resulting gypsum board products are also described. The process comprises adding an aqueous siloxane emulsion to an aqueous slurry of a calcium sulfate material and host particles, where the siloxane emulsion is stable under the condition in which the slurry is maintained. The process further includes passing said siloxane containing slurry onto a flat porous forming surface to form a filter cake; removing a substantial portion of the water from the filter cake through the porous surface; pressing the filter cake to form a board and remove additional water; and drying the board to remove the remaining free water and to cause the core of the board to reach a temperature sufficient to cure the siloxane.

40 Claims, No Drawings

PROCESS OF PRODUCING GYPSUM WOOD FIBER PRODUCT HAVING IMPROVED WATER RESISTANCE

The present invention relates to an improved composite material; more particularly to a composite gypsum/cellulose fiber material having improved water resistance which is especially useful for making building products. Specifically, the present invention relates to a silicone impregnated gypsum/wood fiber building board having enhanced water resistance through the addition of a siloxane emulsion and preferably a catalyst emulsion to the gypsum and wood fiber during the board manufacturing process.

BACKGROUND AND PRIOR ART

Certain properties of gypsum (calcium sulfate dihydrate) make it very popular for use in making industrial and building products; especially gypsum wallboard. It is a plentiful and generally inexpensive raw material which, through a process of dehydration and rehydration, can be cast, molded or otherwise formed into useful shapes. It is also noncombustible and relatively dimensionally stable when exposed to moisture. However, because it is a brittle, crystalline material which has relatively low tensile and flexural strength, its uses are typically limited to non-structural, non-load bearing and non-impact absorbing applications.

Gypsum wallboard; i.e. also known as plasterboard or drywall, consists of a rehydrated gypsum core sandwiched between multi-ply paper cover sheets, and is used largely for interior wall and ceiling applications. Because of the brittleness and low nail and screw holding properties of its gypsum core, conventional drywall by itself cannot support heavy appended loads or absorb significant impact.

Accordingly, means to improve the tensile, flexural, nail and screw holding strength and impact resistance of gypsum plasters and building products have long been, and still are, earnestly sought.

Another readily available and affordable material, which is also widely used in building products, is lignocellulosic material particularly in the form of wood and paper fibers. For example, in addition to lumber, particleboard, fiberboard, waferboard, plywood and "hard" board (high density fiberboard) are some of the forms of processed lignocellulosic material products used in the building industry. Such materials have better tensile and flexural strength than gypsum. However, they are also generally higher in cost, have poor fire resistance and are frequently susceptible to swelling or warping when exposed to moisture Therefore, affordable means to improve upon these use limiting properties of building products made from cellulosic material are also desired.

Previous attempts to combine the favorable properties of gypsum and cellulosic fibers, particularly wood fibers, have had very limited success. Attempts to add cellulosic fibers, (or other fibers for that matter), to gypsum plaster and/or plasterboard core have generally produced little or no strength enhancement because of the heretofore inability to achieve any significant bond between the fibers and the gypsum. U.S. Pat. Nos. 4,328,178; 4,239,716; 4,392,896 and 4,645,548 disclose recent examples where wood fibers or other natural fibers were mixed into a stucco (calcium sulfate hemihydrate) slurry to serve as reinforcers for a rehydrated gypsum board or the like.

U.S. Pat. No. 4,734,163, teaches a process in which raw or uncalcined gypsum is finely ground and wet mixed with 5–10% paper pulp. The mash is partially dewatered, formed into a cake and further dewatered by pressure rolls until the water/solids ratio is less than 0.4. The cake is cut into green boards, which, after being trimmed and cut, are stacked between double steel plates and put into an autoclave. The temperature in the autoclave is raised to about 140° C. to convert the gypsum to calcium sulfate alpha hemihydrate. During the subsequent incremental cooling of the vessel boards, the hemihydrate rehydrates back to dihydrate (gypsum) and gives the board integrity. The boards are then dried and finished as necessary.

U.S. Pat. No. 5,320,677 to Baig describes a composite product and a process for producing the product in which a dilute slurry of gypsum particles and wood fibers are heated under pressure to convert the gypsum to calcium sulfate alpha hemihydrate. The wood fibers have pores or voids on the surface and the alpha hemihydrate crystals form within, on and around the voids and pores of the wood fibers. The heated slurry is then dewatered to form a filter cake, preferably using equipment similar to paper making equipment, and before the slurry cools enough to rehydrate the hemihydrate to gypsum, the filter cake is pressed into a board of the desired configuration. The pressed filter cake is cooled and the hemihydrate rehydrates to gypsum to form a dimensionally stable, strong and useful building board. The board is thereafter trimmed and dried. The process described in U.S. Pat. No. 5,320,677 is distinguishable from the earlier processes in that the calcination of the gypsum takes place in the presence of the wood fibers, while the gypsum is in the form of a dilute slurry, so that the slurry wets out the wood fibers, carrying dissolved gypsum into the voids of the fibers, and the calcining forms acicular calcium sulfate alpha-hemihydrate crystals in situ in and about the voids.

These prior art products, like ordinary gypsum wallboard, gypsum tile, gypsum block, gypsum casts, and the like have relatively little resistance to water. When ordinary gypsum wallboard, for example, is immersed in water. the board quickly absorbs a considerable amount of water, and loses a great deal of its strength. Actual tests have demonstrated that when a 2"×4" cylinder of gypsum board core material was immersed In water at about 70° F., the cylinder showed a water absorption of 36% after immersion for 40 minutes. Many attempts have been made in the past to improve the water resistance of gypsum products. These attempts have included the incorporation of water-resistant materials such as metallic soaps, asphalts, siloxanes, resins, etc., within the calcium sulfate hemihydrate slurry. They have also included attempts to coat the finished gypsum product with water resistant films or coatings. One specific example of past attempts to waterproof gypsum integrally by the addition of water-repellent substances is disclosed in U.S. Pat. No. 2,198,776 to King and Camp. This shows the incorporation of paraffin, siloxane, asphalt, etc. into the aqueous slurry by spraying the molten material into the slurry.

It is an object of the present invention to provide a gypsum-wood fiber board product having the strength and dimensional stability of the type of product described in U.S. Pat. No. 5,320,677 and having improved water resistance.

SUMMARY OF THE INVENTION

It is a principal objective of the present invention to provide a gypsum building board having improved water resistance, which is formed by combining gypsum with another substance having higher strength, such as a wood fiber, and having a silicone polymer uniformly dispersed throughout said board, to provide stronger building products which have improved resistance to water and other forms of moisture.

It is a related objective to provide a process for producing such a gypsum building board wherein an aqueous emulsion of a siloxane, and preferably an aqueous emulsion of a catalyst adapted to cure said siloxane, is added to a heated slurry of calcium sulfate hemihydrate and another substance having higher strength, such as wood fiber, wherein said heated siloxane-containing slurry is passed onto a porous, flat forming surface to form a shaped filter cake which is further processed to provide the gypsum board product.

A more specific objective of the invention is to provide a paperless wallboard which has uniformly good strength, including resistance to nail and screw pull-out, throughout its expanse; which is more dimensionally stable; and which is more water resistant, i.e. it maintains its strength even on exposure to water; which is fire resistant; and which can be produced at a practical cost.

The main objectives are realized, according to the invention, by adding an aqueous siloxane emulsion to a dilute heated slurry of calcium sulfate hemihydrate and a host particle of a stronger material, passing the heated slurry onto a porous flat forming surface to form a filter cake which is dewatered and pressed to form a board before the hemihydrate is completely rehydrated to gypsum. The main objectives, are preferably realized, according to the invention, by adding a siloxane emulsion stabilized with a cationic emulsifier, and preferably a catalyst emulsion also stabilized with a cationic emulsifier, to a hot dilute slurry of a calcium sulfate material which has been calcined under conditions that produce acicular alpha hemihydrate crystals in and about the voids of a host particle of a stronger material, passing the slurry to a porous flat forming surface to form a filter cake which is dewatered with minimal loss of the siloxane and catalyst emulsions. The filter cake is pressed to form a board before the hemihydrate completely rehydrates to gypsum, after which the board is dried under conditions that cure the siloxane within the board. It has been found that the addition of the siloxane/catalyst emulsions to the slurry improves the water resistance of the board.

The term "gypsum", as used herein, means calcium sulfate in the stable dihydrate state; i.e. $CaSO_4 \cdot 2H_2O$, and includes the naturally occurring mineral, the synthetically derived equivalents, and the dihydrate material formed by the hydration of calcium sulfate hemihydrate (stucco) or anhydrite. The term "calcium sulfate material", as used herein, means calcium sulfate in any of its forms, namely calcium sulfate anhydrite, calcium sulfate hemihydrate, calcium sulfate dihydrate and mixtures thereof.

The term "host particle" is meant to cover any macroscopic particle, such as a fiber, a chip or a flake, of a substance other than gypsum. The particle, which is generally insoluble in the slurry liquid, should also have accessible voids therein; whether pits, cracks, fissures, hollow cores, or other surface imperfections, which are penetrable by the slurry menstruum and within which calcium sulfate crystals can form. It is also desirable that such voids are present over an appreciable portion of the particle; it being apparent that the more and better distributed the voids, the greater and more geometrically stable will be the physical bonding between the gypsum and host particle. The substance of the host particle should have desirable properties lacking in the gypsum, and, preferably, at least higher tensile and flexural strength. A ligno-cellulosic fiber, particularly a wood fiber, is an example of a host particle especially well suited for the composite material and process of the invention. Therefore, without intending to limit the material and/or particles that qualify as a "host particle", wood fiber(s) is often used hereafter for convenience in place of the broader term.

The term "gypsum/wood fiber", which is sometimes abbreviated as "GWF", as used herein, is meant to cover a mixture of a calcium sulfate material and host particles, e.g. wood fibers, which is used to produce boards wherein at least a portion of the calcium sulfate material is in the form of acicular calcium sulfate dihydrate crystals positioned in and about the voids of the host particles, wherein the dihydrate crystals are formed in situ by the hydration of acicular calcium sulfate hemihydrate crystals in and about the voids of said particles. The GWF boards are preferably produced by the process of U.S. Pat. No. 5,320,677.

The term "siloxane", as used herein, means a low molecular weight hydrogen modified siloxane adapted to be polymerized into a silicone. The term "siloxane emulsion", as used herein, means an aqueous emulsion of one or more such siloxanes, which is stable in a GWF slurry under the conditions which maintain calcium sulfate hemihydrate crystals therein. The siloxane emulsion must comprise a siloxane which is adapted to cure or polymerize to a silicone during the board drying step to provide improved water resistance to the finished product.

The term "catalyst emulsion", as used herein, means an aqueous emulsion of one or more catalysts, which is stable in a GWF slurry under the conditions which maintains calcium sulfate hemihydrate crystals therein. The catalyst emulsion must comprise a catalyst which is adapted to promote the cure of the siloxane to a silicone during the board drying step, to provide improved water resistance to the finished product.

Both the siloxane and the catalyst must be inert with respect to the gypsum and wood fibers which make up the product. Both the siloxane and the catalyst must be in the form of emulsions which are stable under the temperature and electrolyte conditions under which the hemihydrate/wood fiber slurry emerges from the calcination process in which the gypsum is converted to calcium sulfate alpha hemihydrate. The siloxane must be adapted to cure at the core temperature achieved by the board during the final drying of the product. More importantly, both emulsions not only must be stable in the presence of the various additives which are used to regulate the crystallization of the hemihydrate and the various accelerators or retarders which are used to adjust the process by which the rehydration of the gypsum occurs, but the emulsions must not interfere with the operation of those additives. Most importantly, a high proportion of the emulsions must adhere to the gypsum/wood fiber particles during the process by which the slurry is dewatered to remove most of the water and form a filter cake, in order to avoid the loss of the emulsions with the water removed from the slurry. In the preferred embodiment, both the siloxane emulsion and the catalyst emulsion are stabilized through the use of a suitable cationic emulsifier, such as a cationic quaternary amine, or a suitable nonionic emulsifier with a high HLB value such as a block polyol.

In the process, uncalcined gypsum and host particles are mixed together with sufficient liquid to form a dilute slurry which is then heated under pressure to calcine the gypsum, converting it to a calcium sulfate alpha hemihydrate. While the micro-mechanics of the invention are not fully understood, it is believed that the dilute slurry menstruum wets out the host particle, carrying dissolved calcium sulfate into the voids therein. The hemihydrate eventually nucleates and forms crystals, predominantly acicular crystals, in-situ in and about the voids of the host particle. Crystal modifiers can be added to the slurry if desired. The resulting composite is a host physically interlocked with calcium sulfate crystals. This interlocking not only creates a good bond between the calcium sulfate and stronger host particle, but prevents migration of the calcium sulfate away from the host particle when the hemihydrate is subsequently rehydrated to the dihydrate (gypsum).

A plurality of such composite particles form a material mass which can be compacted, pressed into boards, cast, sculpted, molded, or otherwise formed into desired shape prior to final set. After final set, the composite material can be cut, chiseled, sawed, drilled and otherwise machined. Moreover, it exhibits the desirable fire resistance and dimensional stability of the gypsum plus certain enhancements (particularly strength and toughness) contributed by the substance of the host particle.

According to a preferred embodiment of the invention, the host particle is a paper fiber. The process for making a composite gypsum/wood-fiber material, according to the invention, begins with mixing between about 0.5% to about 30%, and preferably between 3% to 20%, by weight, wood fibers with the respective complement of ground, but uncalcined, gypsum. The dry mix is combined with enough liquid, preferably water, to form a dilute slurry having about 70%–95% by weight water. The slurry is processed in a pressure vessel at a temperature sufficient to convert the gypsum to calcium sulfate hemihydrate. It is desirable to continuously agitate the slurry with gentle stirring or mixing to break up any fiber clumps and keep all the particles in suspension. After the hemihydrate has formed and has precipitated out of solution as hemihydrate crystals, the pressure on the product slurry is relieved when the slurry is discharged from the autoclave and the siloxane emulsion and other desired additives are added to the slurry. While still hot, the slurry is passed through a head box onto a felting conveyor on which a filter cake is formed. As much as 90% of the uncombined water may be removed from the filter cake by the felting conveyor. As a consequence of the water removal, the filter cake is cooled to a temperature at which rehydration may begin. However, it may still be necessary to provide additional external cooling to bring the temperature low enough to accomplish the rehydration within an acceptable time.

Before extensive rehydration takes place, the filter cake is preferably wet-pressed into a board of desired thickness and/or density. If the board is to be given a special surface texture or a laminated surface finish, it would preferably occur during or following this step of the process. During the wet pressing, which preferably takes place with gradually increasing pressure to preserve the product's integrity, two things happen. Additional water, for example about 50–60% of the remaining water, is removed. As a consequence of the additional water removal, the filter cake is further cooled to a temperature at which rapid rehydration occurs. The calcium sulfate hemihydrate hydrates to gypsum, so that the acicular calcium hemihydrate crystals are converted to gypsum crystals in situ in and around the wood fibers. After rehydration is complete, the boards can be cut and trimmed, if desired, and then sent through a kiln for drying. Preferably, the drying temperature should be kept low enough to avoid recalcining any gypsum on the surface, but high enough to promote the cure of the siloxane.

In order to achieve the maximum improvement in water resistance, it is considered essential to use a siloxane emulsion which is stable in the GWF slurry at the temperature and in the chemical environment existent during the time the slurry is formed into a filter cake, shaped and dewatered. The stability of the siloxane emulsion is markedly enhanced by the use of either a suitable cationic emulsifier or through the use of a nonionic emulsifier having a high HLB number in the siloxane emulsion. It has been found that siloxane emulsions which are not sufficiently stable produce GWF boards with inferior water resistance. Preferably, the siloxane and catalyst selected should have a rate of cure sufficient to thoroughly cure the siloxane within the GWF board as the board is dried.

A composite gypsum/wood-fiber board made according to the foregoing process offers a GWF board having improved water resistance as well as the synergistic combination of desirable features offered by the prior art boards, e.g. the boards made by the process of U.S. Pat. No. 5,320,677. Because the board of the present invention has improved water resistance, it offers improved strength, including nail and screw pull-out resistance, over conventional plasterboard and prior art gypsum/wood fiber boards. Moreover, it can be produced over a range of density and thickness.

These and other features and advantages of the invention will be apparent to those skilled in the art following the more detailed discussion of the invention which follows.

DETAILED DESCRIPTION OF THE PRESENT INVENTION

The basic process begins by mixing uncalcined gypsum and host particles (e.g. wood or paper fibers) with water to form a dilute aqueous slurry. The source of the gypsum may be from raw ore or from the by-product of a flue-gas-desulphurization or phosphoric-acid process. The gypsum should be of a relatively high purity, i.e., preferably at least about 92–96%, and finely ground, for example, to 92–96%—minus 100 mesh or smaller. Larger particles may lengthen the conversion time. The gypsum can be introduced either as a dry powder or via an aqueous slurry.

The host particle is preferably a cellulosic fiber which may come from waste paper, wood pulp, wood flakes, and/or another plant fiber source. It is preferable that the fiber be one that is porous, hollow, split and/or rough surfaced such that its physical geometry provides accessible intersticies or voids which accommodate the penetration of dissolved calcium sulfate. In any event the source, for example, wood pulp, may also require prior processing to break up clumps, separate oversized and undersized material, and, in some cases, pre-extract strength retarding materials and/or contaminants that could adversely affect the calcination of the gypsum; such as hemi-celluloses, acetic acid, etc.

The ground gypsum and wood fibers are mixed with sufficient water to make a slurry containing about 5–30% by weight solids, although slurries containing about 5–20% by weight solids are preferred. The solids in the slurry should comprise from about 0.5% to 30% by weight of wood fibers and preferably from about 3% to 20% wood fibers, the balance being mainly gypsum.

Conversion to Hemihydrate

The slurry is fed into a pressure vessel equipped with a continuous stirring or mixing device. Crystal modifiers, such as organic acids, can be added to the slurry at this point, if desired, to stimulate or retard crystallization or to lower the calcining temperature. Steam is injected into the vessel to bring the interior temperature of the vessel up to between about 212° F. (100° C.) and about 350° F. (177° C.), and autogeneous pressure; the lower temperature being approximately the practical minimum at which the calcium sulfate dehydrate will calcine to the hemihydrate state within a reasonable time; and the higher temperature being about the maximum temperature for calcining hemihydrate without undue risk of causing some the calcium sulfate hemihydrate to convert to anhydrite. The autoclave temperature is preferably on the order of about 285° F. (140° C.) to 305° F. (152° C.).

When the slurry is processed under these conditions for a sufficient period of time, for example on the order of 15 minutes, enough water will be driven out of the calcium sulfate dihydrate molecule to convert it to the hemihydrate molecule. The solution, aided by the continuous agitation to keep the particles in suspension, will wet out and penetrate the open voids in the host fibers. As saturation of the solution is reached, the hemihydrate will nucleate and begin forming crystals in, on and around the voids and along the walls of the host fibers.

It is believed that during the autoclaving operation, the dissolved calcium sulfate penetrates into the voids in the wood fibers and subsequently precipitates as acicular hemihydrate crystals within, on and about the voids and surfaces of the wood-fibers. When the conversion is complete, the pressure on the autoclave is reduced, desired additives, including the siloxane emulsion and the catalyst emulsion, are introduced, typically at the head box, and the slurry is discharged onto a dewatering conveyor. Conventional additives including accelerators, retarders, preservatives, fire retardants and strength enhancing agents may be added to the slurry at this point in the process. It has been found that certain additives, such as the particular accelerator (to speed the hydration of the calcium sulfate hemihydrate to gypsum) may markedly affect the level of improvement in water resistance achieved by the siloxane emulsion. As a result, potash or other materials are preferred as the accelerator over alum.

The Siloxane Emulsions

The present invention broadly contemplates improving the water resistance of gypsum wood fiber boards by adding a polymerizable siloxane, in the form of a stable emulsion, to a hot calcined gypsum/wood fiber slurry, which is then shaped, dewatered, pressed and dried under conditions which promote the polymerization of the siloxane to form a highly cross-linked silicone resin. Preferably a catalyst which promotes the polymerization of the siloxane to form a highly cross-linked silicone resin, also in the form of a stable emulsion, is added to the gypsum/wood fiber slurry.

The siloxane is generally a fluid linear hydrogen-modified siloxane, but can also be a cyclic hydrogen-modified siloxane. Such siloxanes are capable of forming highly cross-linked silicone resins. Such fluids are well known to those of ordinary skill in the art and are commercially available and are described in the patent literature. Typically, the linear hydrogen modified siloxanes useful in the practice of the present invention comprise those of the general formula:

wherein R represents a saturated or unsaturated mono-valent hydrocarbon radical. In the preferred embodiments, R represents an alkyl group and most preferably R is methyl.

In the preferred embodiment of this invention, the siloxane fluid is a hydrogen methyl siloxane fluid such as Dow Corning's 1107 fluid which has the general formula:

wherein n=35 and the polymer is SiMe$_3$ end blocked (according to Dow Corning product literature).

The siloxane emulsion is preferably added to the slurry after it has been released from the autoclave, preferably immediately prior to the head box, in order to provide sufficient time for the siloxane emulsion to thoroughly mix with the slurry prior to the formation of the filter cake and the dewatering step of the process. The temperature of the slurry at the time the siloxane emulsion is added is not critical, but it is essential that the siloxane emulsion be stable under the conditions of the slurry. That is, the siloxane emulsion must be stable at the temperature of the slurry at the time the siloxane emulsion is mixed with the gypsum-wood fiber slurry and the siloxane emulsion must remain stable in the presence of the additives, such as accelerators, that are present in the slurry. The siloxane emulsion must remain stable through the dewatering and board formation steps as well. Most importantly, a high proportion of the siloxane should be retained in the filter cake during the dewatering process. With such high retention, a noticeable increase in water resistance will usually be imparted when the quantity of the siloxane emulsion added to the slurry is sufficient to provide at least about 0.1% by weight of siloxane based on the weight of the total solids in the slurry. It is preferred to used from about 1% to about 2% by weight of siloxane to achieve a high level improvement in water resistance.

The Catalyst Emulsion

The catalyst used to promote the conversion of the hydrogen methyl siloxane to a silicone polymer, i.e. curing the siloxane, is preferably a water-insoluble Bronstead base most preferably selected from a variety of primary amines. For the reasons described below, it is preferred to select a catalyst that is capable of being emulsified using a high HLB emulsifier. As a consequence, the catalyst must not be soluble in water (i.e., in order to form a water-in-oil emulsion). The preferred catalysts for use in the present invention are aliphatic primary amines, including aliphatic mono-, di-, and poly-amines derived from fatty and rosin acids. In addition to the mono- and dialkylamines, useful catalysts include emulsifiers of the structure: RNHCHCH$_2$NH$_2$, where the alkyl group is derived from coconut, tallow and soybean oils; or is 9-octyldecenyl. Such materials meet the necessary criteria of catalyzing the siloxane to silicone conversion and also can be chosen so that they are not appreciably water soluble.

Among the catalysts which may be used are the aliphatic amines sold by Tomah Products, Inc. under the names PA-17 and DA-17 and a coconut oil derived amine sold by Akzo Nobel Chemicals, Inc. under the name Armeen C.

The catalyst emulsion is preferably added to the slurry contemporaneously with the siloxane emulsion prior to the head box, in order to provide sufficient time for the both emulsions to thoroughly mix with the slurry prior to the formation of the filter cake and the dewatering step of the process. It is essential that the catalyst emulsion be stable under the conditions of the slurry. That is, the catalyst emulsion must be stable at the temperature of the slurry at the time the emulsions are mixed with the gypsum-wood fiber slurry and the emulsions must remain stable in the presence of the additives, such as accelerators, that are present in the slurry. Both emulsions must remain stable through the dewatering and board formation steps as well. Finally, a high proportion of both emulsions are retained in the filter cake during the dewatering processes.

The Emulsifier

A key aspect of the present invention is that the emulsifier impart temperature stability to both the siloxane and catalyst emulsions. This temperature stability is critical to insuring that both emulsions are stable and do not break in conditions of high temperatures in the presence of diverse salts and electrolytes in the GWF slurry. The absence of such thermal and electrolyte stability results in the immediate polymerization of the siloxane to form a solid material which is not thoroughly dispersed in the furnish which produces a board having inferior water resistance.

A key indicator of emulsion stability is the phase inversion temperature (PIT), which may be defined as the temperature at which "the internal and external phases of an emulsion suddenly invert, (e.g., o/w to w/o or vice versa)." It has been shown that the phase inversion temperature (PIT) of nonionic emulsifiers is influenced by emulsifier HLB number. A positive correlation can be drawn of HLB versus PIT, suggesting that a plausible means of imparting temperature stability to an emulsion would be to use a higher HLB nonionic emulsifier.

Addition of salts reduces the PIT, therefore a nonionic emulsifier with a higher PIT value [or a higher HLB value] is required in the presence of electrolytes in order to obtain a more stable emulsion. Cationic emulsifiers inherently impart a higher PIT to an emulsion.

In the present invention, the emulsifier may be either cationic or nonionic, although the cationic emulsifier system is preferred because it causes the resultant emulsion to be cationically charged, thus aiding in the retention of the emulsion in the anionically charged GWF filter cake during the filter cake formation and dewatering process.

In the case of the cationic emulsifier, quaternary ammonium emulsifiers are the preferred emulsifier. Quaternary ammonium emulsifiers retain their positive charge over a broad range of pH. These emulsifiers further promote thermally stable emulsions. The primary criterion in the selection of a suitable quarternary ammonium emulsifier is then based on the amount of residual primary amine carried over from the manufacturing process. Primary amines are potent catalysts for the conversion of the poly (hydrogenmethylsiloxane) to the silicone and the presence of a primary amine can greatly diminish the stability of a given siloxane emulsion. A number of available quaternary emulsifiers were tested for their ability to promote a stable poly(hydrogenmethylsiloxane) emulsion. The preferred emulsifier is a fatty acid quaternary ammonium cationic emulsifier sold by ICI Emulsifiers under the name G-265. It has an HLB value of approximately 33.

The G-265 emulsifier contains approximately 0.9% of primary amine, according to its manufacturer. In order to complex (tie up) this residual primary amine contaminant, a small amount of aluminum sulfate (i.e. alum), a strong Lewis acid was added to the G-265 emulsifier. In the preferred practice of this invention, 1.0 grams of the alum solution is added for every 5 grams of G-265 emulsifier. The addition of the alum introduces $Al^{+3}$ ions that complex with any residual primary amine. Using this mechanism, the primary amine is no longer available to catalyze the siloxane polymerization reaction. This imparts a greater degree of stability to the siloxane emulsion.

In the case of a nonionic emulsifier, the HLB value of the emulsifier is related directly with the thermal stability of the resultant emulsion. It is preferred that the emulsifier have a high HLB number, preferably at least 20.0 or higher. The preferred nonionic emulsifier is a block polyol sold by PPG Industries under the name Macol 27. The HLB number of this emulsifier is 22.0.

Dewatering

The hot siloxane-containing slurry is passed through the head box which distributes the slurry onto a flat porous forming surface to produce a filter cake. The filter cake is dewatered by the evaporation of water when the slurry is released from the autoclave and by the water in the slurry passing through the porous forming surface, preferably aided by vacuum. Although the dewatering causes cooling of the filter cake, as much of the water is removed as possible while the temperature of the product slurry is still relatively high and before the hemihydrate is converted into gypsum. As much as 90% of the slurry water is removed in the dewatering device, leaving a filter cake of approximately 35% water by weight. At this stage the filter cake consists of wood fibers interlocked with rehydratable calcium sulfate hemihydrate crystals and can still be broken up into individual composite fibers or nodules, shaped, cast, or compacted to a higher density.

The formation of the filter cake, the dewatering of the filter cake is preferably carried out using paper making equipment of the type described in U.S. Pat. No. 5,320,677, which is made a part of this disclosure.

Pressing and Rehydration

The dewatered filter cake is wet-pressed for a few minutes to further reduce the water content and to compact the filter cake into the desired shape, thickness and/or density. Although, the extraction of the bulk of the water in the dewatering step will contribute significantly to lowering the filter cake temperature, additional external cooling may be required to reach the desired level within a reasonable time. The temperature of the filter cake is preferably reduced to below about 120° F. (49° C.), so that relatively rapid rehydration can take place. The rehydration recrystallizes the alpha hemihydrate crystals into acicular gypsum crystals in place, physically interlocked with the wood fibers.

Depending on the accelerators, retarders, crystal modifiers, or other additives provided in the slurry, hydration may take from only a few minutes to an hour or more. Because of the interlocking of the acicular hemihydrate crystals with the wood-fibers, and the removal of most of the carrier liquid from the filter cake, migration of the calcium sulfate is averted, leaving a homogeneous composite. The rehydration effects a recrystallization of the hemihydrate crystals to dihydrate crystals in situ, i.e. within and about the voids of the wood fibers, thereby preserving the homogeneity of the composite. The crystal growth also connects the calcium sulfate crystals on adjacent fibers to form an overall crystalline mass, enhanced in strength by the reinforcement of the wood fibers.

When the hydration is complete, it is desirable to promptly dry the composite mass to remove the remaining free water. Otherwise, the hygroscopic wood fibers tend to hold, or even absorb, uncombined water which will later evaporate. If the calcium sulfate coating is fully set before the extra water is driven off, the fibers may shrink and pull away from the gypsum when the uncombined water does evaporate. Therefore, for optimum results it is preferable to remove as much excess free water from the composite mass as possible before the temperature drops below the level at which hydration begins.

Drying

The pressed board, which typically contains about 30% by weight of free water, is then promptly dried at a relatively high temperature in order to reduce the free water content to about 0.5% or less in the final product. During the drying step it is important to raise the internal temperature of the final product high enough, for a short period of time, to promote the polymerization of the siloxane to a silicone. Obviously, drying conditions which tend to calcine the gypsum should be avoided. It has been found that it is desirable to carry out the drying under conditions in which the product achieves a core temperature of at least 170° F. (77° C.), and preferably a core temperature between about 170° F. (77° C.) and 200° F. (93° C.). The set and dried board can be cut and otherwise finished to desired specification.

When finally set, the unique composite material exhibits desired properties contributed by both of its two components. The wood fibers increase the strength, particularly flexural strength, of the gypsum matrix, while the gypsum acts as a coating and binder to protect the wood fiber, impart fire resistant and decrease expansion due to moisture.

The following examples will serve to illustrate the preparation and testing of gypsum/wood fiber products with improved water resistance of the present invention, but it is understood that these examples are set forth for illustrative purposes and that many other gypsum wood fiber products having improved water resistance may be made using suitable variations.

EXAMPLE 1

The following siloxane emulsion containing 5% by weight of siloxane was prepared using Dow Corning 1107 (described above), stabilized with ICI G-265 (described above).

| | |
|---|---|
| Water | 3352.6 g |
| Dow Corning 1107 Siloxane Oil | 176.4 g |
| G-265 (100% active) | 2.7 g |

Procedure: Added Dow Corning 1107 to stainless steel blender. Added water and G-265 to glass beaker. The G-265 was a viscous liquid. Stirred water and the G-265 in a beaker for 10 minutes to dissolve the G-265. The G-265 completely dissolved in the water. Added solution to blender. Blended at low speed for 60 seconds using a Waring 1-Gallon Commercial Blender (3-speed model).

EXAMPLE 2

The following primary amine catalyst emulsion containing 4.9% of primary amine was prepared using Tomah DA-17 (described above), stabilized with ICI G-265 (described above):

| | |
|---|---|
| Water | 2514.6 g |
| Glacial Acetic Acid | 13.2 g |
| G-265 (100% active) | 19.9 g |
| DA-17 (Tomah Products) | 132.3 g |

Procedure: Under continuous magnetic stirring, 2514.6 grams of water was heated to 70° C. (158° F.) in a beaker with magnetic stirring. Added 13.2 grams of glacial acetic acid and 19.9 grams of G-265 emulsifier to this beaker. To this solution was added 132.3 grams of DA-17 with stirring. Removed from heat and allowed solution to cool gradually to room temperature with magnetic stirring.

EXAMPLE 3

A standard GWF board product is produced as follows: A mixture of 85% by weight of an uncalcined FGD gypsum (the by-product of flue gas desulphurization) and 15% by weight of fiber, composed of 3.75% of paper fiber and 11.25% of spruce fiber, is added to a stirred autoclave with enough water to create a slurry having 15% by weight solids. The resulting slurry is heated under pressure to about 295° F. for 15 minutes, which allows the gypsum to be calcined to form alpha hemihydrate.

The pressure in the slurry is released as the slurry is discharged from the autoclave. The resulting evaporation of water cools the slurry to about 180° to 212° F. The emulsions described below along with accelerators are added to the slurry which is then fed to the head box of the forming line. The accelerators were 0.5% by weight of $K_2SO_4$ (Potash) and 1% by weight of a sugar coated calcium dihydrate (as described, for example, in U.S. Pat. No. 3,813,312), based on the weight of the total solids in the slurry. The slurry is distributed onto a porous conveyor on which a filter cake is formed. The filter cake is passed through a vacuum dewatering device which removes about 60% of the water and the slurry/filter cake reaches a temperature of about 120° F. The filter cake is pressed into a board approximately ½ inch thick as it is subjected to further vacuum treatment to remove more water and cool the board to about 95° F., for best rehydration of the hemihydrate to gypsum. After rehydration, the board is cut into panels and the panels are dried under conditions which cause the core of the board to reach about 200° F. for a short period of time. The resulting boards are then tested, as is reported below.

Five boards were prepared using the following concentrations of siloxane (based on the total solids of the slurry), provided in the form of the emulsion of Example 1. In each case, the catalyst emulsion of Example 2 was added to the slurry in an amount sufficient to provide 15% of the catalyst, based on the weight of the siloxane.

| | |
|---|---|
| Board #1 | Control |
| Board #2 | 0.5% Siloxane; 15% Catalyst |
| Board #3 | 1.0% Siloxane; 15% Catalyst |
| Board #4 | 1.5% Siloxane; 15% Catalyst |
| Board #5 | 2.0% Siloxane; 15% Catalyst |

Three samples from each of the boards were tested for water resistance. The average of the three observed water resistance values are reported in Table 1, below:

TABLE 1

| BOARD NUMBER | Siloxane percent | Cobb Test - (% weight gain) | Immersion Test (% weight gain) |
|---|---|---|---|
| 1 | 0.0 | 67.94 | 67.61 |
| 2 | 0.5 | 11.84 | 31.02 |
| 3 | 1.0 | 1.58 | 8.72 |
| 4 | 1.5 | 1.18 | 6.04 |
| 5 | 2.0 | 0.83 | 3.10 |

The water resistance values for the three samples were closely grouped indicating good distribution of the siloxane emulsion within the board.

The commercial emulsifier used in the forgoing examples, G-265, contains approximately 0.9% of primary amine. In order to complex (tie up) this residual primary amine contaminant, a small amount of aluminum sulfate (i.e., alum), a strong Lewis acid was added to the emulsifier. In practice, 1,0 grams of a 10% alum solution was added for every 5 grams of G-265 emulsifier. The addition of the alum introduced $Al^{+3}$ ions that complex with any residual primary amine contaminant.

The forms of invention shown and described herein are to be considered only as illustrative. It will be apparent to those skilled in the art that numerous modifications may be made therein without departing from the spirit of the invention and the scope of the appended claims.

I claim:

1. A process for making a gypsum board product having improved water resistance which comprises:

adding an aqueous siloxane emulsion to an aqueous slurry of a calcium sulfate material and host particles, while said slurry is at a temperature at which calcium sulfate hemihydrate crystals are maintained, said siloxane emulsion comprises at least one hydrogen modified siloxane, said siloxane emulsion being stable under the conditions in which the calcium sulfate hemihydrate crystals are maintained;

passing said siloxane-containing slurry onto a flat porous forming surface to form a filter cake before the temperature of said filter cake falls below the temperature at which the calcium sulfate hemihydrate rehydrates to calcium sulfate dihydrate;

removing a substantial portion of the water from said filter cake through said porous surface and cooling said filter cake to a temperature at which rehydration begins, pressing said filter cake to form a board and remove additional water whereby the calcium sulfate hemihydrate crystals about said host particles rehydrate in situ to calcium sulfate dihydrate crystals; and drying said board to remove the remaining free water and to cause the core of said board to reach a temperature sufficient to cure said siloxane.

2. The process as described in claim 1, wherein said siloxane emulsion comprises hydrogen methyl siloxane.

3. The process as described in claim 1, wherein said siloxane emulsion comprises a cationic emulsifier.

4. The process as described in claim 3, wherein said siloxane emulsion comprises a quaternary amine cationic emulsifier.

5. The process as described in claim 4, wherein $Al^{+3}$ ion is added to the quaternary amine cationic emulsifier.

6. The process as described in claim 1, wherein said siloxane emulsion comprises a nonionic emulsifier.

7. The process as described in claim 6, wherein said siloxane emulsion comprises an emulsifier having a HLB number in excess of about 20.

8. The process as described in claim 1, wherein the quantity of siloxane emulsion added to said slurry is sufficient to provide at least about 0.1% by weight of siloxane solids to said slurry, based on the weight of the total solids in said slurry.

9. The process as described in claim 8, wherein the quantity of siloxane emulsion added to said slurry is sufficient to provide from about 1% to about 2% by weight of siloxane solids to said slurry, based on the weight of the total solids in said slurry.

10. The process as described in claim 1, wherein an aqueous catalyst emulsion is added to said slurry, while said slurry is at a temperature at which the calcium sulfate hemihydrate crystals are maintained, said catalyst emulsion being stable under the conditions in which the calcium sulfate hemihydrate crystals are maintained, said catalyst adapted to promote the curing of said siloxane.

11. The process as described in claim 10, wherein said catalyst emulsion comprises a primary amine.

12. The process as described in claim 11 wherein said catalyst emulsion comprises a water-insoluble primary amine.

13. The process as described in claim 10, wherein said catalyst emulsion comprises a cationic emulsifier.

14. The process as described in claim 13, wherein said catalyst emulsion comprises a quaternary amine cationic emulsifier.

15. The process as described in claim 10, wherein said catalyst emulsion comprises a non-ionic emulsifier.

16. The process as described in claim 15, wherein said catalyst emulsion comprises an emulsifier having a HLB number in excess of about 20.

17. The process as described in claim 1, wherein the dilute slurry comprises calcium sulfate material and discrete lignocellulosic host particles having voids over a substantial portion of their bodies, said slurry being sufficiently dilute to substantially wet out the penetrable voids in the host particles.

18. The process as described in claim 17, wherein the host particles are paper fibers or are wood fibers selected from the group consisting of chemically refined wood pulp, mechanically refined wood pulp, thermo-mechanically refined wood pulp and combinations of the foregoing.

19. The process as described in claim 18, wherein the solids in the slurry comprise about 0.5–30% by weight wood fibers.

20. The process as described in claim 19, wherein the solids in the slurry comprise between about 3–20% by weight wood fibers.

21. A process for making a GWF board having improved water resistance, comprising:

mixing ground gypsum and host particles together with sufficient water to form a slurry, said host particles each having voids on its surface and/or within its body penetrable by the slurry menstruum containing suspended and/or dissolved gypsum and said slurry being sufficiently dilute to substantially wet out the penetrable voids in the host particles and to foster the formation of acicular calcium sulfate alpha hemihydrate crystals when heated under pressure;

heating the slurry in a pressure vessel, with continuous agitation, to a temperature sufficient to calcine the gypsum to calcium sulfate alpha-hemihydrate;

maintaining the slurry at such temperature until at least some calcium sulfate hemihydrate has crystallized in and about the voids in the host particles;

adding an aqueous siloxane emulsion to said slurry while said slurry is at a temperature at which the calcium sulfate hemihydrate crystals are maintained, said siloxane emulsion comprises at least one hydrogen modified siloxane, said siloxane emulsion being stable under the conditions in which the calcium sulfate hemihydrate crystals are maintained;

passing said siloxane-containing slurry onto a flat porous forming surface to form a filter cake before the temperature of said filter cake falls below the temperature at which the calcium sulfate hemihydrate crystals rapidly rehydrate to dihydrate crystals;

cooling said filter cake to a temperature at which rehydration occurs;

pressing said filter cake to form a board and to remove additional water therefrom whereby said calcium sulfate hemihydrate crystals in and about the voids in the host particles rehydrate to form calcium sulfate dihydrate crystals; and drying the board to remove the remaining free water from said board and cure said siloxane.

22. The process as described in claim 21, wherein said siloxane emulsion comprises hydrogen methyl siloxane.

23. The process as described in claim 21, wherein said siloxane emulsion comprises a cationic emulsifier.

24. The process as described in claim 23, wherein said siloxane emulsion comprises a quaternary amine cationic emulsifier.

25. The process as described in claim 24, wherein $Al^{+3}$ ion is added to the quaternary amine cationic emulsifier.

26. The process as described in claim 21, wherein said siloxane emulsion comprises a nonionic emulsifier.

27. The process as described in claim 26, wherein said siloxane emulsion comprises an emulsifier having a HLB number in excess of about 20.

28. The process as described in claim 21, wherein the quantity of siloxane emulsion added to said slurry is sufficient to provide at least about 0.1% by weight of siloxane solids to said slurry, based on the weight of the total solids in said slurry.

29. The process as described in claim 28, wherein the quantity of siloxane emulsion added to said slurry is sufficient to provide from about 1% to about 2% by weight of siloxane solids to said slurry, based on the weight of the total solids in said slurry.

30. The process as described in claim 21, wherein an aqueous catalyst emulsion is added to said slurry, while said slurry is at a temperature at which the calcium sulfate hemihydrate crystals are maintained, said catalyst emulsion being stable under the conditions in which the calcium sulfate hemihydrate crystals are maintained, said catalyst adapted to promote the curing of said siloxane.

31. The process as described in claim 30, wherein said catalyst emulsion comprises a primary amine.

32. The process as described in claim 31 wherein said catalyst emulsion comprises a water-insoluble primary amine.

33. The process as described in claim 30, wherein said catalyst emulsion comprises a cationic emulsifier.

34. The process as described in claim 33, wherein said catalyst emulsion comprises a quaternary amine cationic emulsifier.

35. The process as described in claim 30, wherein said catalyst emulsion comprises a non-ionic emulsifier.

36. The process as described in claim 35 wherein said catalyst emulsion comprises an emulsifier having a HLB number in excess of about 20.

37. The process as described in claim 21, wherein the dilute slurry comprises calcium sulfate material and discrete ligno-cellulosic host particles having voids over a substantial portion of their bodies, said slurry being sufficiently dilute to substantially wet out the penetrable voids in the host particles.

38. The process as described in claim 37, wherein the host particles are paper fibers or are wood fibers selected from the group consisting of chemically refined wood pulp, mechanically refined wood pulp, thermo-mechanically refined wood pulp and combinations of the foregoing.

39. The process as described in claim 37, wherein the solids in the slurry comprise about 0.5–30% by weight wood fibers.

40. The process as described in claim 39, wherein the solids in the slurry comprise between about 3–20% by weight wood fibers.

\* \* \* \* \*